E. J. MADDEN.
RETAINING DEVICE FOR LENSES AND THE LIKE.
APPLICATION FILED MAY 3, 1912.
1,048,983.
Patented Dec. 31, 1912.
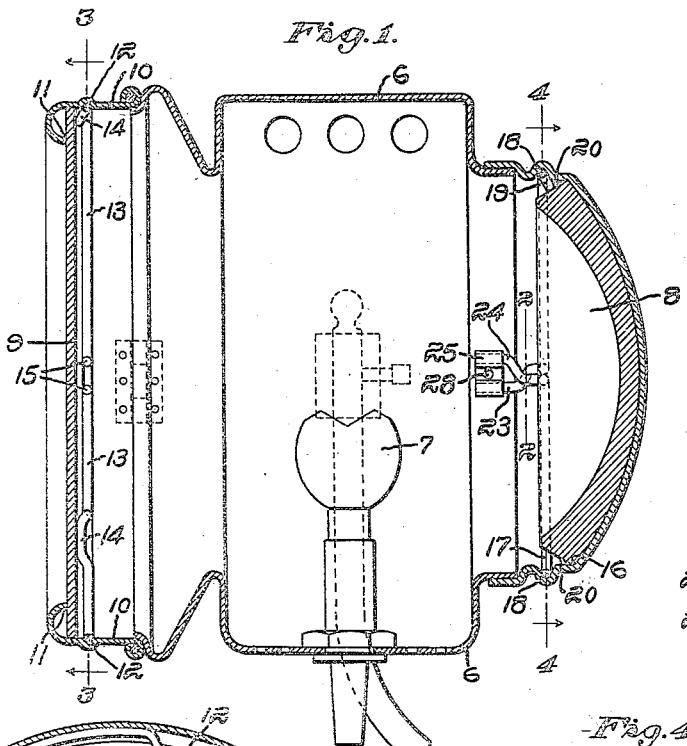
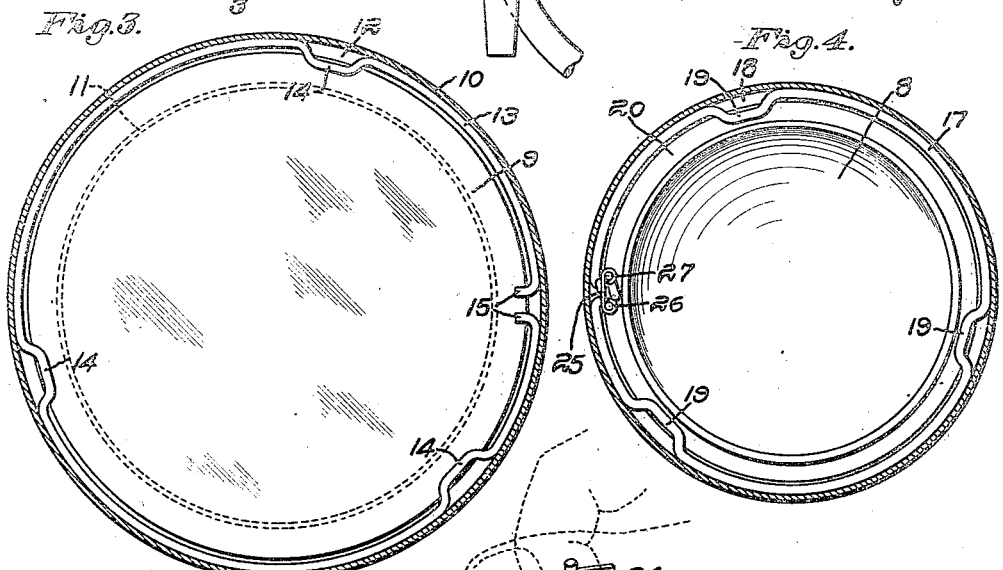
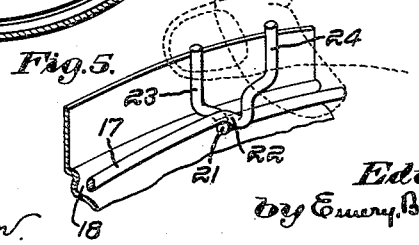
Witnesses:
Carl L. Choate.
Horace A. Crossman.
Inventor:
Edward J. Madden,
by Emery, Booth, Janney & Varney
Attys.

UNITED STATES PATENT OFFICE.

EDWARD J. MADDEN, OF BRIDGEPORT, CONNECTICUT, ASSIGNOR TO THE HAWTHORNE MANUFACTURING COMPANY, OF BRIDGEPORT, CONNECTICUT, A CORPORATION OF CONNECTICUT.

RETAINING DEVICE FOR LENSES AND THE LIKE.

1,048,983.  Specification of Letters Patent.  Patented Dec. 31, 1912.

Application filed May 3, 1912. Serial No. 694,805.

*To all whom it may concern:*

Be it known that I, EDWARD J. MADDEN, a citizen of the United States, and a resident of Bridgeport, in the county of Fairfield and State of Connecticut, have invented an Improvement in Retaining Devices for Lenses and the Like, of which the following description, in connection with the accompanying drawings, is a specification, like characters on the drawings representing like parts.

My invention relates to retaining devices for lenses, lens mirrors, plain glass fronts, and other similar parts of lamps, and will be best understood by reference to the following specification, when taken in connection with the accompanying illustration of one specific embodiment thereof, while its scope will be more particularly pointed out in the appended claims.

In the drawings: Figure 1 is a central vertical longitudinal section of a specific lamp embodying my invention; Fig. 2 is a sectional view on an enlarged scale on line 2—2 of Fig. 1 looking toward the right; Fig. 3 is a sectional view on line 3—3 of Fig. 1 looking toward the left; Fig. 4 is a sectional view on line 4—4 of Fig. 1 looking toward the right; and Fig. 5 is a detail perspective view showing terminal portions of the retaining ring and illustrating the mode of unlocking the same with the thumb and forefinger, the latter being shown in dotted lines.

Referring to the drawings and to the embodiment of my invention which I have there shown for illustrative purposes, I have there shown a lamp having a casing 6, which may be of any suitable character having therein a light-furnishing element 7 of any desired type, herein an acetylene gas burner, although it will be distinctly understood that my invention is not limited in its application to any particular type of lamp. I have herein shown the lamp as being provided with a lens mirror 8 and a glass front 9, which may also be in the form of a lens if desired.

The glass front 9 is mounted in the casing 6, preferably in a door frame 10 provided with a suitable seat 11 for the glass front, and also provided with an annular groove 12 forming a seat for a retaining ring 13. This ring is seated throughout the greater part of its extent in the groove, and is provided with suitable means projecting inwardly onto the glass front 9, herein a plurality of projections 14, and preferably, though not necessarily, three in number, preferably formed by bending the wire which forms the ring. Preferably these projections are offset from the plane of the ring and groove toward the glass front 9 (see Fig. 1) so as to engage the latter with a slightly yielding pressure and compensate for expansion or contraction of the glass. Since the retaining ring is seated practically throughout in the groove 12, it is immovable when in place, cannot rattle, and forms a positive lock for the glass front, the latter being also firmly seated in such a manner as to be normally immovable. The retaining ring is preferably of the interrupted expansible and contractible type, and is preferably made so that it is normally larger in diameter than its seat, and will spring firmly into place in the latter when released. The ring may be provided with any suitable means for effecting its removal and replacement, as for example a pair of inwardly projecting terminal portions 15, which when drawn together serve to contract the ring to effect its release from the groove in which it is normally seated.

The lens mirror 8 is seated in a suitably formed seat 16, and is held thereagainst by a retaining ring 17 preferably seated in an annular groove 18 and provided with means projecting inwardly onto the lens mirror, preferably a plurality of projections 19 herein three. Preferably the lens mirror is provided with a beveled marginal surface 20 against which the projections 19 rest in such a manner that the same is self-centering, and is firmly held against its seat with no lateral movement whatever. Preferably these projections are offset from the plane of the ring and groove toward the lens mirror 8 (see Fig. 1) so as to engage the latter with a slightly yielding pressure and compensate for expansion or contraction of the mirror. The retaining ring 17 is preferably of the interrupted expansible and contractible type, and is preferably normally larger in diameter than its seat so as to spring firmly into place when inserted. The retaining ring is preferably provided with shoulders 21 and 22, normally abutting against each other, and preventing the ring from contracting (Fig. 2), and is further provided with terminal portions 23 and 24, which cross each other and have parallel ends constituting grasping portions. If desired, the retaining ring may be further locked by means of a clip 25 having holes 26 and 27 to receive the parallel terminal portions 23 and 24, as shown in Figs. 1 and 4. If desired, this clip may be provided with an aperture 28 to receive a suitable tool (not shown) assisting in the removal of the clip.

The retaining ring is removed by first removing the clip 25 by withdrawing the same longitudinally from the parallel ends of the terminal portions 23 and 24 of the retaining ring. The operator then grasps the terminal portions 23 and 24 in the manner illustrated in dotted lines in Fig. 5, placing the end of the thumb against the portion 23 and the inner side of the forefinger against the opposite side of the portion 24. He then twists the said portions from the position shown in Figs. 1 and 4 to the position shown in Fig. 5, thus withdrawing the shoulder 22 from its engagement with the shoulder 21, after which the ring may be easily contracted and removed from its place in the groove 18. The retaining ring may be returned to its place by simply a reversal of the foregoing operation.

In this form of the retaining ring to a still greater degree the ring is held immovable in its seat, and the lens is not only self-centering, but is positively locked so that no movement whatever of the lens or ring can take place, yet both can be easily removed in a moment. Another advantage derived from both of these constructions is that it is unnecessary to provide perforations, slots, or other apertures in the casing for the retaining ring, and which would admit dust and water into the interior of the casing.

While I have herein shown and described two specific embodiments of my invention for illustrative purposes, and have disclosed and discussed in detail the construction and arrangement incidental to these specific applications thereof, it is to be understood that the invention is limited neither to the mere details or relative arrangement of parts nor to its specific embodiment herein shown, but that extensive deviations from the illustrated forms or embodiments of the invention may be made without departing from the principles thereof.

Having thus described my invention, what I claim is:—

1. The combination with a support provided with a circular seat, of a body seated in said support, and a retaining ring having a circular portion also seated in and fitting said seat and having means projecting inwardly onto said body to hold the latter with respect to said support.

2. The combination with a support provided with a circular seat, of a body seated in said support, and a retaining ring having a circular portion also seated in and fitting said seat and having three projections extending inwardly onto one face of said body to hold the latter in said support.

3. The combination with a support provided with a circular seat, of a body seated in said support, and an interrupted expansible and contractible retaining ring having its major portion formed on an arc of a circle and seated in and fitting said seat and having three projections projecting inwardly onto one face of said body to hold and center the latter with respect to said support.

4. The combination with a support, of a body seated in said support, and a split retaining ring seated within said support having means projecting inwardly onto said body to hold the latter with respect to its seat, said ring having a pair of interlocking terminal portions.

5. The combination with a support, of a body seated in said support, and a split retaining ring seated in said support having means projecting inwardly onto said body to hold the latter with respect to its seat, said ring having means normally to prevent contraction thereof.

6. The combination with a support, of a body seated in said support, and a split retaining ring seated in said support having means projecting inwardly onto said body to hold the latter with respect to its seat, said ring having locking means normally to lock the same against contraction.

7. The combination with a support, of a body seated in said support, and a split retaining ring seated in said support having means projecting inwardly onto said body to hold the latter with respect to its seat, said ring having shoulders normally abutting against each other and preventing contraction thereof.

8. The combination with a support, of a body seated in said support, and a split retaining ring seated in said support having means projecting inwardly onto said body to hold the latter with respect to its seat, said ring having shoulders normally abutting against each other and preventing contraction thereof, and means for locking the terminal portions of said ring to each other.

9. The combination with a support, of a body seated in said support, and a split retaining ring seated in said support having means projecting inwardly onto said body to hold the latter with respect to its seat, said ring having shoulders normally abutting against each other and preventing contraction thereof, and a clip provided with holes receiving the terminal portions of said ring and locking the same.

10. The combination with a support, of a body seated in said support, and a split retaining ring seated in said support having means projecting inwardly onto said body to hold the latter with respect to its seat, said ring having shoulders normally abutting against each other and preventing contraction thereof, and having a pair of parallel terminal portions, and a clip provided with a pair of parallel holes in which said terminal portions are located.

11. The combination with a support, of a body seated in said support, and a retaining ring also seated in said support and having means offset from the plane of said ring and engaging said body at an angle to hold the latter with respect to its seat.

12. The combination with a support, of a body seated in said support, and a retaining ring seated against said seat and having a plurality of projections offset from the plane of said ring and engaging said body at an angle to hold the latter with respect to its seat.

13. The combination with a support, of a body seated in said support, and a retaining ring also seated in said support and engaging said body, said retaining ring having abutting shoulders and terminal portions crossing each other.

14. The combination with a support, of a body seated in said support and provided with a beveled marginal surface, and a retaining ring also seated in said support and having means engaging said beveled surface substantially at right angles thereto.

15. The combination with a support, of a body seated in said support and provided with a beveled marginal surface, and a retaining ring also seated in said support and having means offset from the plane of said ring and engaging said beveled surface at an angle thereto.

16. The combination with a support, of a body seated in said support and provided with a beveled marginal surface, and a retaining ring also seated in said support and having three projections engaging said beveled surface substantially at right angles thereto.

17. The combination with a support, of a body seated in said support, and a retaining ring also seated in said support and having projecting means engaging said body at an angle to hold the latter with respect to its seat.

In testimony whereof, I have signed my name to this specification, in the presence of two subscribing witnesses.

EDWARD J. MADDEN.

Witnesses:
E. A. HAWTHORNE,
E. HORACE HAWTHORN.